United States Patent
Emaru et al.

(10) Patent No.: US 7,680,921 B2
(45) Date of Patent: Mar. 16, 2010

(54) MANAGEMENT SYSTEM, MANAGEMENT COMPUTER, MANAGED COMPUTER, MANAGEMENT METHOD AND PROGRAM

(75) Inventors: Hironori Emaru, Yokohama (JP); Toshiaki Hirata, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 1368 days.

(21) Appl. No.: 10/660,300

(22) Filed: Sep. 10, 2003

(65) Prior Publication Data

US 2004/0107278 A1 Jun. 3, 2004

(30) Foreign Application Priority Data

Nov. 28, 2002 (JP) .............................. 2002-344811

(51) Int. Cl.
G06F 15/173 (2006.01)
G06F 11/30 (2006.01)
G06F 17/18 (2006.01)
G08B 29/00 (2006.01)

(52) U.S. Cl. ....................... 709/224; 709/223; 702/186; 702/179; 340/506

(58) Field of Classification Search ................ 709/223, 709/224; 702/186, 179; 340/506
See application file for complete search history.

(56) References Cited

U.S. PATENT DOCUMENTS

| | | | | |
|---|---|---|---|---|
| 6,633,230 | B2 * | 10/2003 | Grandin et al. | 340/506 |
| 6,643,613 | B2 * | 11/2003 | McGee et al. | 702/186 |
| 6,714,976 | B1 * | 3/2004 | Wilson et al. | 709/224 |
| 2002/0161877 | A1 * | 10/2002 | Stevenson et al. | 709/223 |

FOREIGN PATENT DOCUMENTS

| | | |
|---|---|---|
| JP | 63-083843 A | 4/1988 |
| JP | 05-134902 | 6/1993 |
| JP | 05-173839 A | 7/1993 |
| JP | 11-045195 | 2/1999 |

* cited by examiner

*Primary Examiner*—Philip C Lee
(74) *Attorney, Agent, or Firm*—Townsend and Townsend and Crew LLP

(57) ABSTRACT

A management system of one embodiment of the invention has a management computer and a managed computer which is managed by the management computer. The management computer comprises a communication device configured to receive operating data of a monitoring object inside a managed computer and information relating to an event. A processor is configured to identify from the operating data received by the communication device a portion of the operating data which relates to the event, based on the operating data and the information relating to the event indicating trouble occurrence or performance decrement of the monitoring object.

16 Claims, 7 Drawing Sheets

| TIME | HOST | PROCESS ID | RESPONSE TIME | EVENT |
|---|---|---|---|---|
| 03:45:01 | A | 180 | 60 msec | |
| 03:46:00 | B | 602 | 120 msec | |
| 03:47:01 | A | 180 | 420 msec | a down |
| 03:47:58 | B | 602 | 80 msec | a down |
| 03:49:00 | A | 180 | 640 msec | a down |

| TIME | HOST | PROCESS ID | RESPONSE TIME | EVENT |
|---|---|---|---|---|
| 03:47:01 | A | 180 | 420 msec | a down |
| 03:49:00 | A | 180 | 640 msec | a down |

MANAGEMENT SYSTEM, MANAGEMENT COMPUTER, MANAGED COMPUTER, MANAGEMENT METHOD AND PROGRAM

CROSS-REFERENCES TO RELATED APPLICATIONS

This application relates to and claims priority from Japanese Patent Application Number 2002-344811, filed on Nov. 28, 2002, the entire disclosure of which is incorporated herein by reference.

BACKGROUND OF THE INVENTION

1. Field of the Invention

This invention relates to a technology for obtaining operating data in a management system and carrying out a trouble analysis. In particular, it relates to a technology for identifying operating data (e.g., metric or performance data) necessary for the trouble analysis, in response to an event which has occurred.

2. Description of the Related Art

In general, data which is treated by an operation management tool includes operating data and event data.

The operating data refers to data which is obtained from a monitoring object (object to be monitored), by determining a monitoring point for obtaining data, time for monitoring and so on. The event means, when there occurs a phenomenon such as trouble occurrence and performance decrement or degradation in the monitoring object, data which is used for informing a management device of occurrence of the phenomenon.

Among conventional approaches, there is a technology for putting together and storing operating information in chronological order by saving operating data obtained in a permanent secondary memory device in the form of a text and data base (e.g., JP-A-5-134902). Also, there is a technology for automatically carrying out processing which was registered in advance, based upon occurrence of an event, by mailing a fact or notice that an event occurred to a mail address which was registered in advance (e.g., JP-A-11-45195).

Among conventional approaches, there are ones in which the operating data and the events are saved separately. Therefore, in order to know the time when a trouble occurred, it was necessary to take a look at a log of events individually. Also, it was difficult to take a mapping of how the event appeared in the operating data. Further, in case of carrying out the trouble analysis, the main part of the operating data is data at the time of steady state, and therefore, it was necessary to wade through a large amount of operating data in order to extract a small quantity of data at the time of trouble. Moreover, since the operating data had to be obtained regularly, required was a file device of large capacity for storing it.

SUMMARY OF THE INVENTION

Embodiments of the present invention are directed to methods and systems for effectively extracting data necessary for the trouble analysis while reducing the resource of necessary memory device capacity in a management system.

In accordance with an aspect of the invention, a management system has a management computer and a managed computer which is managed by the management computer. The management computer comprises a communication device configured to receive operating data of a monitoring object inside a managed computer and information relating to an event. A processor is configured to identify from the operating data received by the communication device a portion of the operating data which relates to the event, based on the operating data and the information relating to the event indicating trouble occurrence or performance decrement of the monitoring object.

In some embodiments, the managed computer may have a processor which obtains the operating data from the monitoring object inside a device and generates the information relating to events for showing that the operating data satisfies a predetermined standard, and a communication device which identifies the operating data necessary for the trouble analysis and transmits the identified operating data to the management computer, on the basis of the operating data and the information relating to events.

In some embodiments, the information relating to events may include at least one of information showing presence or absence of occurrence of an event, host information showing whether or not the managed computer which had occurrence of an event is a computer which adopted the operating data, and information showing time of occurrence of an event.

In specific embodiments, the management computer may further include an operating data buffer and a data storage. The operating data buffer is in the memory device, and the data storage is in the disk device or storage device. Here, the processor of the management computer may store the operating data from the managed computer in the operating data buffer, and when the information relating to events is received, may store the whole or a part of the information relating to events in the operating data buffer, in association with the operating data stored in the operating data buffer, and may write the operating data and the information relating to events from the operating data buffer to the data storage. Here, the processor of the management computer may, as another embodiment, determine the operating data to be written from the operating data buffer to the data storage on the basis of the information relating to events, and may write the identified operating data in the data storage, and may carry out the trouble analysis on the basis of the operating data.

In accordance with another aspect of the present invention, an operating management method for managing one or more monitoring objects on the basis of operating data comprises receiving the operating data of the monitoring object and information relating to an event; identifying from the operating data received by the communication device a portion of the operating data which relates to the event, based on the operating data and the information relating to the event indicating trouble occurrence or performance decrement of the monitoring object; and displaying the identified operating data.

BRIEF DESCRIPTION OF THE DRAWINGS

The invention, together with further advantages thereof, may best be understood by reference to the following description taken in conjunction with the accompanying drawings in which:

FIG. 9 shows an analysis image which is displayed on a display device of the monitoring computer according to an embodiment; and FIG. 10 shows an analysis image which is displayed on a display device relating to occurrence of an event according to an embodiment.

DETAILED DESCRIPTION OF THE INVENTION (1) First Embodiment

Figure 1:
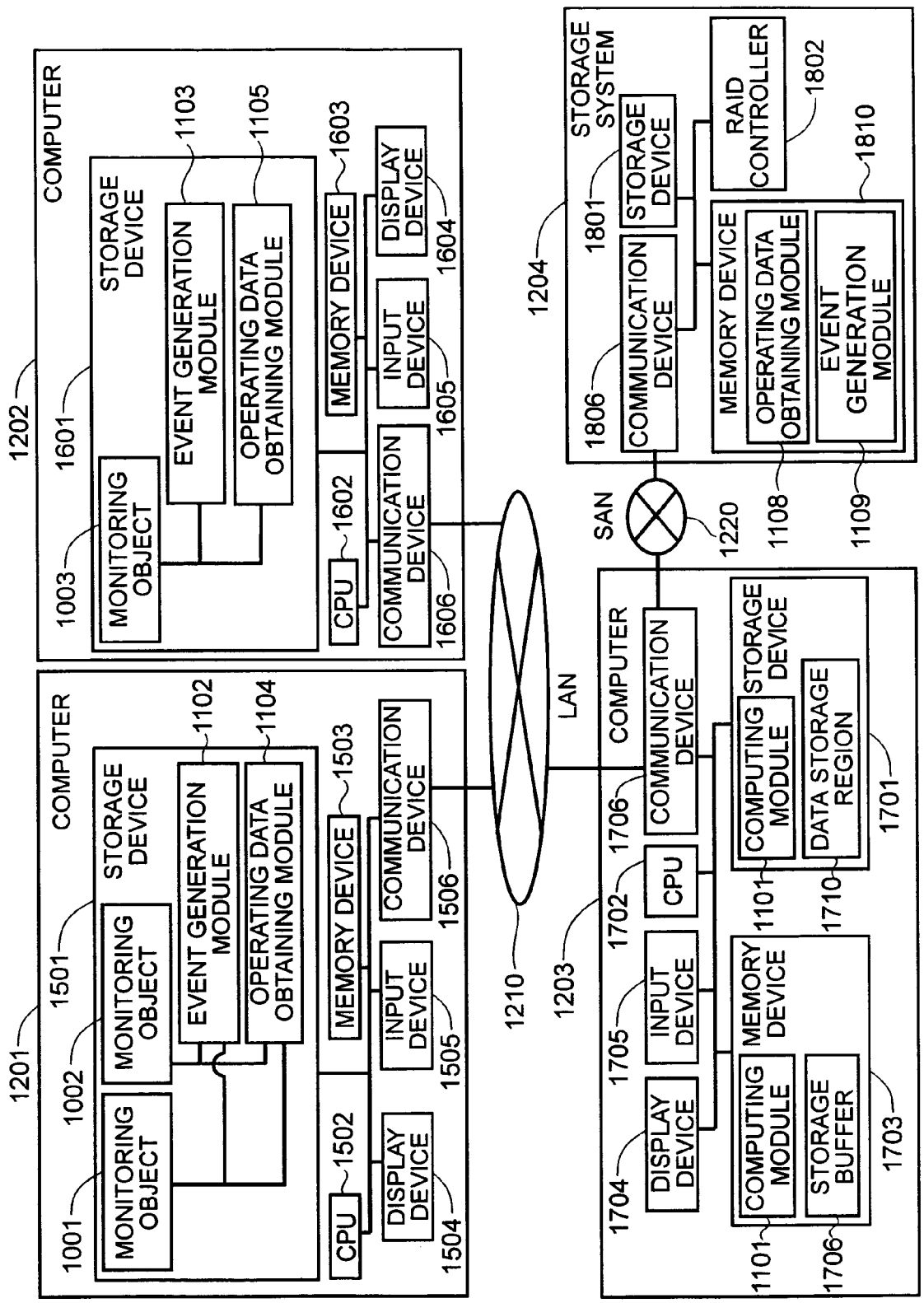
FIG. 1 is a structural view of a system in a first embodiment of the invention.

FIG. 1 is a structural view of a computer system which realizes an operating data collecting method of this embodiment.

This computer system comprises a computer 1203 which includes a computing module 1101 that is a program for carrying out processing of operating data collected and events and perpetuation to a secondary memory device, computers 1201 and 1202 which carry out a monitoring object that is an object for obtaining the operating data and events, and LAN 1210 which connects between the computers.

The computer 1201 is an object computer including the monitoring object, and has a storage device 1501, CPU 1502, a memory device 1503, a display device 1504, an input device 1505 such as a keyboard and a mouse, and a communication device 1506 for connecting to LAN 1210. These structures are connected by a bus. The computer 1202 likewise has a storage device 1601, CPU 1602, a memory device 1603, a display device 1604, an input device 1605 such as a keyboard and a mouse, and a communication device 1606 for connecting to LAN 1210.

In the storage device 1501, programs 1001 and 1002 which are monitoring objects and a program 1102 which functions as an event generation module and a program 1104 which functions as an operating data obtaining module are stored. The CPU executes a program which is loaded from the storage device 1501 to the memory device 1503. The display device displays a result of execution of the program as the monitoring object. The input device accepts input data for instructing to the program as the monitoring object.

In the embodiment, there are two computers which become the monitoring objects but there is no limitation as to the number of computers.

The event generation modules 1102 and 1103 are programs which monitor the monitoring objects and generate events according to determined conditions and transfer them to the computing module 1101 through LAN 1210. As an example of the event generation conditions, cited are occurrence of a trouble in the monitoring object, response time, exceeding of a threshold value of a parameter such as memory amount which is monitored, and so on.

The operating data obtaining modules 1104 and 1105 are programs which monitor the monitoring object, and receive an instruction from the computing module 1101, and obtain the operating data according to the need, and transfer the obtained operating data to the computing module 1101 through LAN 1210.

The monitoring objects 1001 to 1003 refer to objects to be monitored such as occurrence of a trouble, response time and memory amount. In addition, in FIG. 1, the program is shown as the monitoring object but, it is possible to use hardware configuring the computer such as the memory device, the input device, the communication device, CPU and the display device, as the monitoring object.

In the situation where, instead of the computer 1201, the storage device (e.g., RAID device etc.) is managed through a network (SAN) by the computer 1203, characteristic of the storage device (e.g., performance characteristic of a memory region etc.) may be made to be the operating data of the embodiment. Storage system such as a RAID device 1204 is an example of this, and has a communication device 1806 for connecting to a storage device 1801, RAID controller 1802, memory device 1810 and SAN 1220. These structures are connected by a bus. The memory device 1810 includes a program 1109 which functions as the event generation module and a program 1108 which functions as the operating data obtaining module. The RAID controller 1802 carries out execution of a program which is loaded from the storage device 1801 to the memory device 1810 and control of the RAID device. In addition, even if the operating data obtaining module 1108 and the event generation module 1109 are disposed in the storage device 1801, it is possible to realize the invention.

The computer 1203 is a monitoring computer which monitors the object computers 1201 and 1202, and has a storage device 1701, CPU 1702, a memory device 1703, a display device 1704, an input device 1705 such as a keyboard and a mouse, and a communication device 1706 for connecting to LAN 1210. These structures are connected by a bus.

In the storage device 1701, the program 1101 which functions as the computing module and a data storage region 1710 are stored. The CPU executes the computing module 1101 which was loaded from the storage device 1701 to the memory device 1703. In a storage buffer 1706 and the data storage region 1710, the operating data is saved by the CPU. In the storage buffer of the memory device 1703, after a certain number of the operating data is buffered temporarily in chronological order, it is stored in the data storage region 1710 of the storage device 1701 with respect to each predetermined number. The display device 1704 outputs information necessary for carrying out the trouble analysis. The storage device 1701 stores the operating data necessary for the trouble analysis. The input device 1705 accepts an input value from an administrator, in order to carry out an instruction to the computing module 1101. In addition, in FIG. 1, the computing module 1101 and the storage buffer 1706 are disposed in a computer 1203 which is different from the computers 1201 and 1202 but, these may be disposed in a computer which includes the monitoring object such as the computer 1201.

Computer-readable memory media, including portable media (such as floppy disk or CD-ROM), may be formed to store the computing module 1101, the event generation modules 1102 and 1103, and the operating data obtaining modules 1104 and 1105 as programs which can be read out by the computers 1201, 1202 and 1203. It is possible to transfer the computing module 1101, the event generation modules 1102 and 1103, and the operating data obtaining modules 1104 and 1105 which are program portions disposed in respective computers from other computers etc. to the storage devices of the computers 1201, 1202 and 1203 through a network, and to load them in the memories of the computers and to execute them by use of CPUs of the computers.

Figure 2:
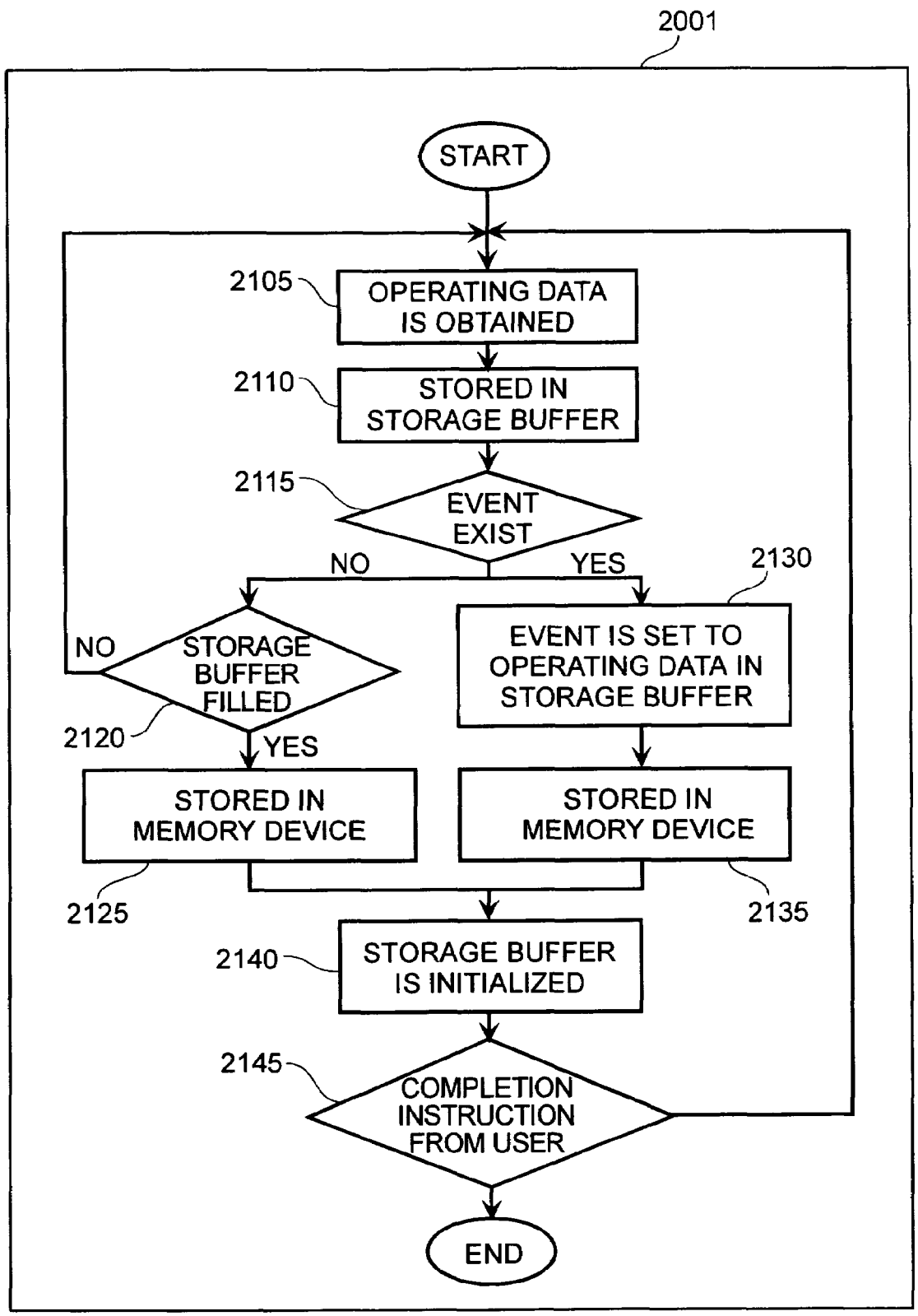
FIG. 2 is an overall flow chart of a computing module in the first embodiment of the invention.

FIG. 2 is a view showing generally the procedures of processing the computing module 1101 of the first embodiment.

At Step 2105, the computing module 1101 obtains the operating data from the operating data obtaining module.

At Step 2110, the operating data obtained is stored in the storage buffer 1706.

At Step 2115, the computing module 1101 checks presence or absence of arrival of an event from the event generation module 1102 or 1103.

At Step 2120, in case that the event is not arrived at Step 2115, the computing module 1101 checks whether the storage buffer is all filled with the operating data.

In case that there is vacancy in the storage buffer, at Step 2120, it goes back to Step 2105.

In case that the storage buffer is all filled with the operating data, at Step 2125, the computing module 1101 stores all of the operating data which is temporarily stored in the storage buffer in the data storage region 1710 of the storage device 1701.

In case that, at step 2115, the event is arrived, at Step 2130, the computing module 1101 carries out addition of event classification to the operating data which is stored in the storage buffer. Here, the operating data to which the event classification is added may be all of the operating data which is stored in the storage buffer but, may be a part of the same which falls within a scope necessary for carrying out the trouble analysis.

At Step 2135, the computing module 1101 stores the operating data to which the event classification was added in the data storage region 1710 of the storage device 1701.

At Step 2140, the computing module 1101 carries out initialization of the storage buffer, by deleting the operating data which is stored in the storage buffer after it stores the operating data in the storage device at Steps 2125 and 2135. Here, storage data which is deleted from the storage buffer may be all, and as described later, may be a part of it.

At Step 2145, the computing module 1101 checks whether or not there is an instruction of stopping collection of the operating data from the input device. If there is the instruction, the procedure is finished, and if not, it goes back to Step 2105.

Figure 3:
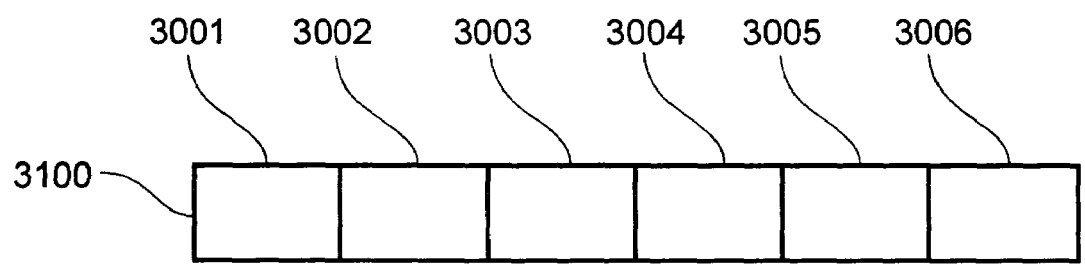
FIG. 3 is a view showing an example of an operating data buffer in the first embodiment of the invention.

FIG. 3 is a structural view of a buffer for storing the operating data on the memory device of the computer 1203. A storage buffer 3100 comprises six operating data fields of 3001 to 3006. The computing module 1101 stores the operating data which is obtained from the operating data obtaining module 1104 or 1105 in the operating data fields. In addition, in FIG. 3, the number of the operating data fields configuring the storage buffer 3100 is 6 but, this number is not limited to 6.

Figure 4:
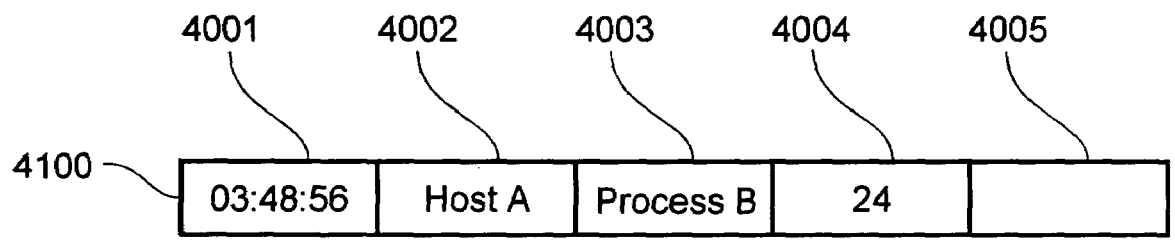
FIG. 4 is a view showing an example of an operating data field in the first embodiment of the invention.

FIG. 4 is a structural view of an operating data field configuring the storage buffer 3100. An operating data field 4100 has a time field 4001, a host field 4002, an operating data sender field 4003, a performance data field 4004, and an event field 4005. In the time field 4001, obtaining time of the operating data obtained is stored. In the host field 4002, IDs of the host computers 1201 and 1202 which generated the operating data obtained are stored. In addition, in the host field 4002, the IDs may be stored in monitoring object unit, or in process unit. In the operating data sender field 4003, a value representing from where the operating data obtained was obtained is stored. For example, in case that the operating data is one which was obtained from a process, name of the process or process ID is stored in this field.

In the performance data field 4004, the operating data which was obtained from the operating data obtaining module is stored. Here, the operating data is data which reflected "how the system is used", "characteristic of the system", "characteristic of the program" and so on, in a composite manner, and for example, there are values representing operating information such as memory capacity used, time using CPU and response time. Accordingly, there is a case that characteristic of the monitoring object is clarified on the basis of a plurality of the operating data. For example, in case that the monitoring object is made to be a program, in an application server in which a request is processed by a thread, cost is required if the thread is generated with respect to each request, and therefore, in general, the thread is utilized by being pooled. Here, by obtaining 1) response time and 2) generation/deletion of the thread as the operating data, if the response time is slow and the generation/deletion of the thread is carried out with respect to each request, the program does not use connection pooling, and therefore, such characteristic of the program becomes apparent that it is a program with bad generation efficiency of connections.

In the event field 4005, a classification of an event which the computing module 1101 obtained from the event generation module is stored. That is, as described in Step 2135 of FIG. 2, the computing module 1101 stores the operating data in the storage device 1701, after the event classification of the event which was received from the event generation module is written in the event field of the operating data which is stored in the operating data buffer 1706. Here, the event is information which is generated in case that the operating data such as memory capacity used, time using CPU and response time satisfied a predetermined standard, and for example, trouble occurrence, performance decrement of CPU, insufficient memory and the like.

In addition, in the embodiment, the event field does not have to be disposed in the storage buffer necessarily. In this case, a classification of an event may be added to the event field when the operating data is stored in the storage device 1701. That is, at Steps 2125 and 2135 of FIG. 2, the computing module 1101 disposes the operating data field in the data storage region 1710 when the operating data is stored in the storage device 1701, and at Step 2135, it adds the classification of the event to the event field which corresponds to the operating data. By processing of Step 2125 or Step 2135, the event classification corresponding to the operating data is stored in the storage device 1701 at the event field of the operating data which was stored in the operating data buffer 1706 at the occurrence of the event.

Also, the computing module 1101 may be made to obtain only the operating data within a certain period after the occurrence of the event from the operating data obtaining module and to store it in the storage buffer 1706.

FIG. 9 shows an analysis image which is displayed on a display device 1704 of the monitoring computer 1203 according to an embodiment. In addition, it is presumed in this embodiment that the analysis image is displayed on a display device on the same computer as the computer which obtains the operating data and the event. It is possible, however, to display the analysis image on a display device of a different computer which was connected to a network, by performing a transfer of the data on the memory device 1101 of the monitoring computer 1203.

The analysis image 9001 includes a time field 9002, a host field 9003, a process ID field 9004, a response time field 9005, and an event field 9006. In addition, this analysis image of the various fields is prepared based on the operating data field 3100. Even if the response time field shows values which represent other operating information such as memory consumed quantity, CPU operating time, and the like, according to the type of data being picked up, it is possible to carry out this embodiment.

In this embodiment, five operating data are displayed in the order of generation time. For the operating data to which the events were given, corresponding events are displayed in the event field 9006. To three operating data from 9012 to 9014, an event of "a down" was obtained from the host A. In this example, due to the generation of the event of "a down," the response time of a process which is operated in the host A is deteriorated. By focusing on the operating data to which the event was given, however, it becomes easy to ascertain the relevancy.

In case that the trouble analysis is carried out by the above-described embodiment, utilizing the operating data which is stored in the storage device 1701, the following advantages will be obtained. Since the operating data to be analyzed can be limited to one whose event classification was written in the event field out of the operating data, overheads for trouble analysis can be reduced. Also, by limiting the operating data to be analyzed to one which corresponds to a classification of a specific event, it is further possible to reduce the overhead for trouble analysis.

(2) Second Embodiment

In the first embodiment, the number of the operating data to which the event classification is added per one event is variable from 0 to the number of the storage buffers, and the number is determined by timing when the event generation module generates the event. Therefore, when the event is generated right after the operating data is stored in the storage device, there is only one operating data to which the event classification is added. In this manner, in the first embodiment, the number of the operating data to which the event classification is added per one event is variable from 0 to the number of the storage buffers, and the number is dependent upon the timing.

In this embodiment, in order to compensate the drawback, by logically dividing the operating data buffer into two, the number of the operating data to which the event classification is added is made to be more than a certain number. Hereinafter, by using the general procedures of processing of the computing module shown in FIG. 2, from the embodiment in the computer system of FIG. 1, a feature of the invention will be described.

As to up to Step 2115, the process is much the same as in the first embodiment.

At Step 2125, in case that the storage buffer is all filled with the operating data at Step 2120, the computing module 1101 stores the operating data in the storage device 1701 but, on this occasion, all of the operating data is not stored in the storage device 1701 and only a part of the operating data of the storage buffer is stored in the storage device 1701, and remaining operating data is saved in the memory device 1703 as it is. In addition, as described in the first embodiment, the operating data is made to be stored in the storage buffer 1706 in chronological order, and to be stored in the storage device 1701 sequentially from old operating data, and data which is to remain in the memory device 1703 is made to remain sequentially from a new one.

At Step 2140 which is executed successively, the computing module 1101 deletes the operating data which is stored in the storage device 1701 and relocates the operating data which remained on the memory device 1703 to the storage device 1701.

Processing in case that there was an event at Step 2115 is the same as in the above-described first embodiment, and at Step 2140, all of the operating data is deleted from the memory device.

Figure 5:
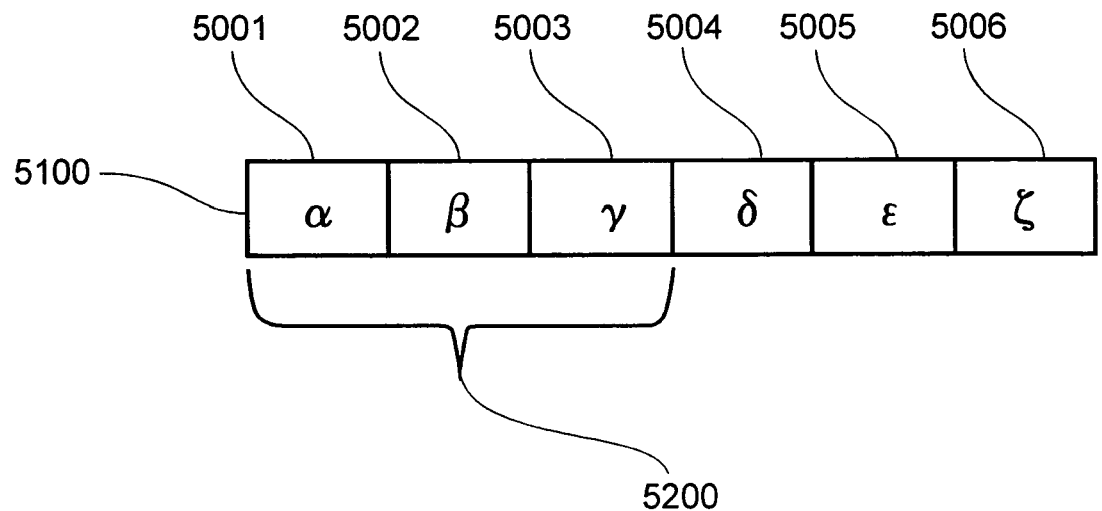
FIG. 5 is a view showing an example of an operating data buffer in a second embodiment of the invention.

FIG. 5 is a view indicating an operating data buffer which is acquired on the memory device 1703 of the computer 1203 in the embodiment. A storage buffer 5100 comprises six operating data fields of 5001 to 5006. One operating data which is obtained from the operating data obtaining module 1104 or 1105 is stored in one operating data field. In addition, in FIG. 5, the number of the operating data fields configuring the storage buffer is 6 but, this number is not limited to 6.

Here, the operating data buffer 1706 is divided into two groups with three data fields in each group. The three operating fields 5200 from 5001 to 5003 are called as storing object fields. In addition, the operating data storage fields are divided into two with 3 as one group to make the storing object fields but, the number of the operating storage fields configuring the storing object fields and the number of division are not limited to these.

Figure 6:
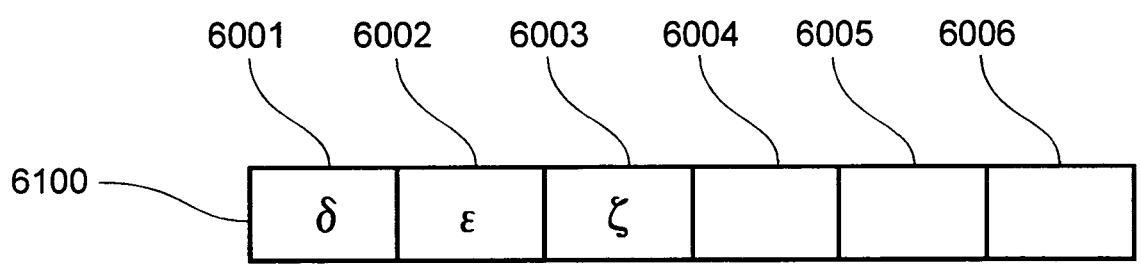
FIG. 6 is a view showing an example of an operating data buffer in the second embodiment of the invention.

In the case of FIG. 5, since all buffers of the storage buffer 5100 are filled with the operating data, the operating data is stored in the storage device at Step 2125 but, only three operating data from 5001 to 5003 as the storing object fields are stored in the storage device, and remaining operating data stored from 5004 to 5006 are relocated to the storage buffers 5001 to 5003 at Step 2140. The operating data fields thus processed is denoted by 6100 in FIG. 6. By doing this, on the occasion that the event was generated, in the storage buffer 1706, four operating data are to be stored at the minimum.

In addition, in a case that the event is generated consecutively, even by using this embodiment, there is no guarantee that the event classification is added to data of more than a certain number to the event at a second time and thereafter. In that case, by dividing the storage buffer into N, it is possible to accommodate events of up to successive N times. But, in case that many events are generated concurrently, in general, those events are considered to be based upon the same trouble, and therefore, it is enough to divide the storage buffer into two as a matter of practice.

(3) Third Embodiment

In the first embodiment and the second embodiment, regardless of presence or absence of occurrence of the event, all of the operating data is stored in the storage device. As an intended usage of the operating data collected, trouble analysis and capacity planning etc. are considered but, in case that the intended usage of the operating data is only on the trouble analysis, the operating data which is not associated with the event is unnecessary. Then, in this embodiment, the operating data which is not necessary for the trouble analysis is not stored in the storage device so that improvement of efficiency of the trouble analysis and reduction of the storage device capacity are realized.

Figure 7:
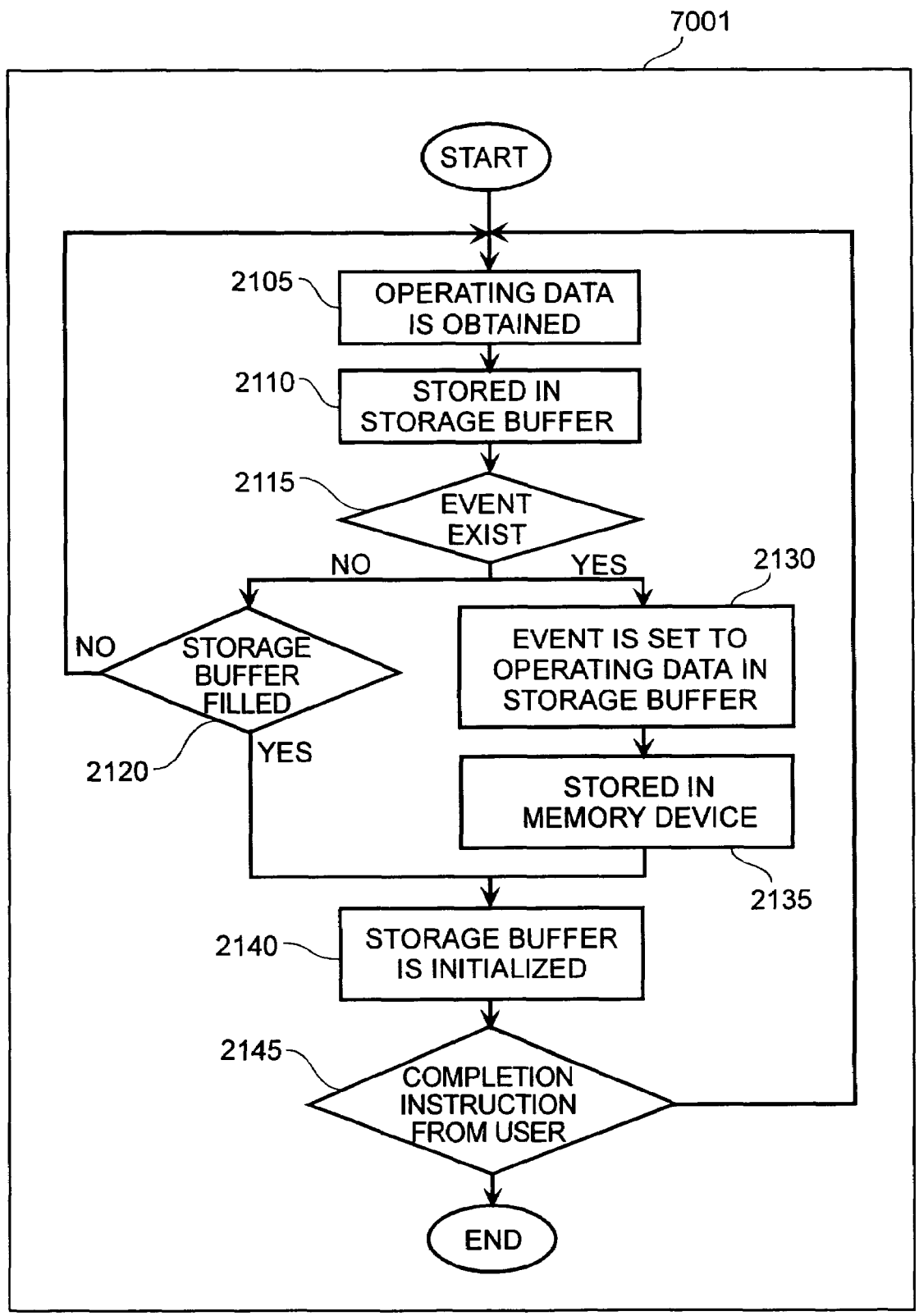
FIG. 7 is an overall flow chart of a computing module in a third embodiment of the invention.

FIG. 7 illustrates a general or simplified procedure of processing of the computing module in the embodiment.

A difference of a general procedure 7001 of processing of the computing module shown in FIG. 7 and the general procedure 2001 of processing of the computing module shown in FIG. 2 is only presence and absence of Step 2125 in which, when the storage buffers are all filled with the operating data, the operating data is stored in the storage device. That is, the operating data which the operating data obtaining module obtained is temporarily stored in the storage buffer 1706 by the computing module 1101 but, if the event is not generated until after the storage buffer is filled, it is deleted without being stored in the storage device 1701. By doing this, the operating data which is stored in the storage device 1701 becomes one as to which the event was set in the event field. In addition, only the operating data relating to a classification of a specific event may be stored particularly.

By this embodiment, it becomes possible to store only the operating data which was associated with the events in the storage device, and improvement of efficiency of the trouble analysis and reduction of the storage device capacity are realized.

(4) Fourth Embodiment

In the third embodiment, on the occasion that the event was generated, the event classification of the event is written in the event field of all operating data which is stored in the storage buffer. However, on the occasion of carrying out the trouble analysis, there are quite a lot of cases in which only the operating data collected from the computer as a generator of events is necessary. Then, in this embodiment, by limiting the operating data as to which the event classification of the event is written at the time of event occurrence and which is stored in the storage device to the operating data collected from the computer as the generator of the event, efficiency improvement of the trouble analysis is realized.

Figure 8:
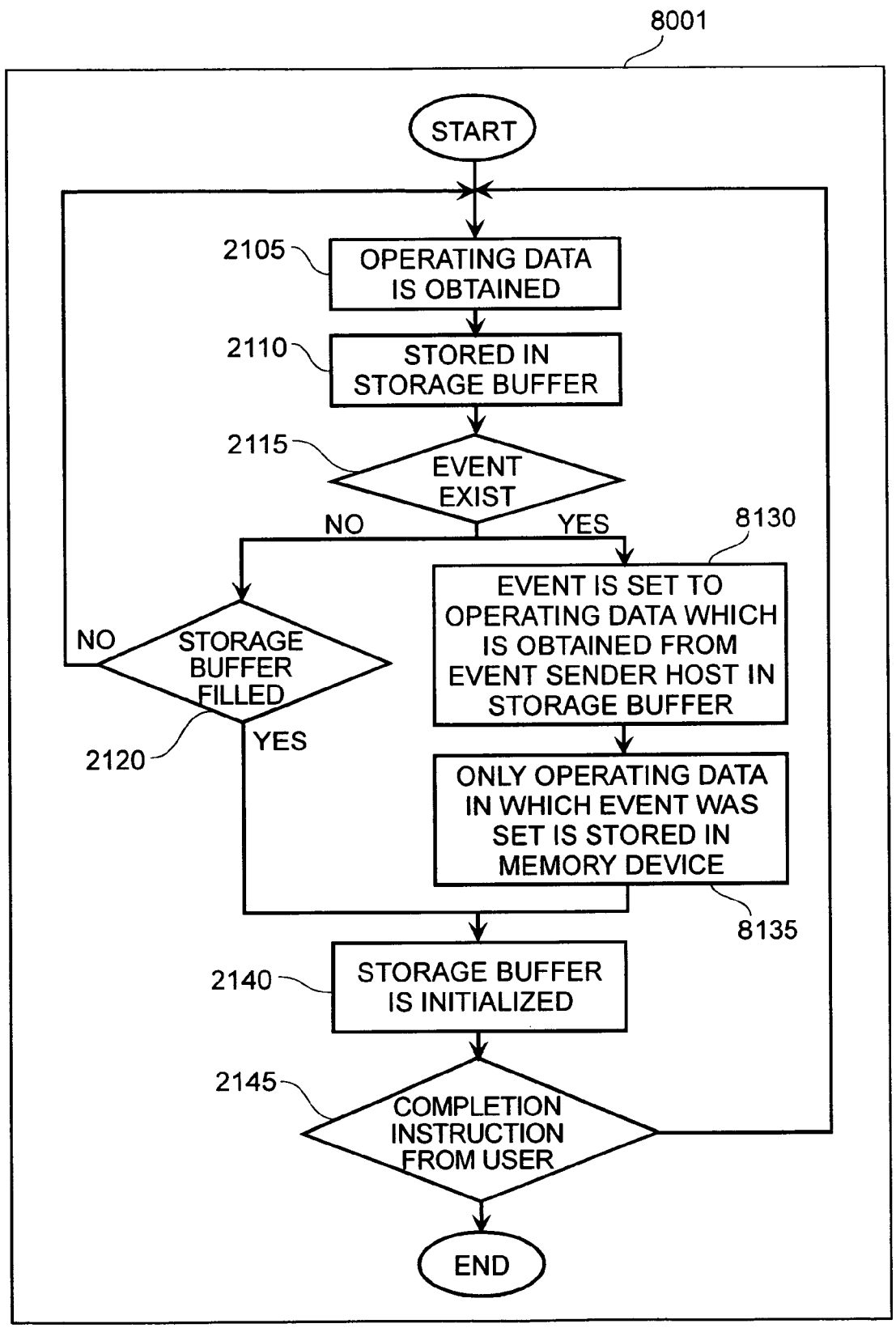
FIG. 8 is an overall flow chart of a computing module in a fourth embodiment of the invention.

FIG. 8 illustrates a general procedure of processing of the computing module in this embodiment. A difference of a general procedure 8001 of processing of the computing module shown in FIG. 8 and a general procedure 7001 of processing of the computing module shown in FIG. 7 is Step 8130 where the computing module 1101 carries out setting of the event classification to the event field of the operating data which is stored in the storage buffer 1706 and Step 8135 where the computing module 1101 carries out perpetuation of the operating data which is stored in the storage buffer to the storage device.

At Step 8130, the computing module 1101 compares a sender host of the event to the operating data sender field of the operating data which is stored in the storage buffer, and if these two are the same, it is known that the operating data is the operating data which was collected from the same host as the event sender host, and therefore, the event classification of the event is written to the event field of the operating data. If it is a different host, nothing is carried out. At Step 8135, the computing module 1101, out of the operating data which is stored in the storage buffer, selects only ones as to which the event classification was written in to the event field, and stores it in the storage device. Processing in other steps is the same as the rough procedure 7001 of processing of the computing module shown in FIG. 7.

By this embodiment, it becomes possible to limit the operating data which is stored in the storage device to operating device which was collected from the computer as the generator of the event at the time of event occurrence, and improvement of efficiency of the trouble analysis and reduction of the storage device capacity are realized.

In addition, it is possible to apply the method for limiting the operating data in which the event classification is written at the time of event generation to operating data which was collected from the computer as the generator of the event to the first embodiment. In this case, all of the operating data is stored in the storage device but, out of it, ones where the event classification is written in the event field is limited to the operating data in which the event is generated when it is stored in the storage buffer, and which was collected from the same host as the event sender host of the event. By this, improvement of efficiency of the trouble analysis is realized.

Furthermore, it is possible to apply, at the time of the event generation, a way of limiting the operating data shown in this embodiment in which the event classification is written to the operating data which was collected from the computer as a generation source of the event, to the first embodiment. In this case, all of the operating data are stored in the memory device. Of the operating data, one in whose event field, the event classification which is written is limited to the operating data which was collected from the same host as the event transmission host of that event, which is generated when stored in the storage buffer.

FIG. 10 shows an analysis image which is displayed on a display device relating to occurrence of an event according to an embodiment. An analysis image 10001 is of the same pattern as that shown in the first embodiment (FIG. 9), and is an analysis image which is displayed when the operating data and the event were obtained. Since "a down" is an event which was obtained from the host A, the operating data which was obtained from the host B is not displayed. By displaying only the operating data which relates to the event (9012, 9014), efficiency improvement of the trouble analysis is realized.

According to the invention, in a management system, it is possible to effectively extract data necessary for trouble analysis, over suppressing a resource of necessary storage device capacity.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. In a management system including a management computer and a plurality of managed computers to be managed by the management computer, the management computer comprising:
   a communication device configured to receive operating data of a monitoring object inside a first managed computer, from among the plurality of managed computers, and information relating to an event from a sender managed computer;
   a memory to store the operating data received by the communication device, the operating data including an identifier associated with the first managed computer;
   a storage device; and
   a processor configured to compare the identifier associated with the first managed computer with the sender managed computer that sends the information relating to the event; and
   wherein the processor determines that the first managed computer is same as the sender managed computer, storing the information relating to the event and the operating data of the monitoring object associated with the event, in the memory, or
   wherein the processor determines that the first managed computer is different from the sender managed computer, not storing the information relating to the event and the operating data of the monitoring object associated with the event, in the memory; and
   wherein when the event indicates a parameter of the monitoring object exceeds a threshold value, and the information relating to the event is stored in the memory, then the operating data received is stored in the storage device, and
   wherein when the event does not indicate the parameter of the monitoring object exceeds the threshold value or the information relating to the event is not stored in the memory, then the operating data received is not stored in the storage device.

2. The management computer as set forth in claim 1, wherein the information relating to the event includes at least one of information showing presence or absence of occurrence of the event, information showing an occurrence time of the event, and information showing a classification of the event, and wherein the processor of the management computer is configured to identify a portion of the operating data which relates to the event, based on the operating data and the information relating to the event including the at least one of the information showing presence or absence of occurrence of the event, the information showing the occurrence time of the event, and the information showing the classification of the event.

3. The management computer as set forth in claim 1, wherein the management computer is configured to manage the plurality of managed computers, wherein the communication device is configured to receive the operating data of monitoring objects inside the plurality of managed computers and the information relating to an event, wherein the information relating to an event includes host information identifying from the operating data received by the communication device a portion of the operating data which is received from the managed computer in which the event occurred, and wherein the processor of the management computer is configured to identify the portion of the operating data which relates to the event, based on the operating data and the information relating to the event including the host information.

4. The management computer as set forth in claim 3, wherein the information relating to the event includes information showing presence or absence of occurrence of the event, and wherein the processor of the management computer is configured to identify the portion of the operating data which relates to the event, based on the operating data and the information showing presence or absence of occurrence of the event.

5. The management computer as set forth in claim 1, wherein the monitoring object includes at least one of a hardware structure part in a storage device connected to the management computer through a network and a program stored in the storage device in the managed computer.

6. The management computer as set forth in claim 1 wherein a portion of the operating data identified by the process is to be used for trouble analysis and to carry out the trouble analysis.

7. A management system comprising a management computer and a plurality of managed computers which are managed by the management computer, wherein a first managed computer, from among the plurality of managed computers, includes:

a managed computer processor which is configured to obtain operating data from a monitoring object inside the first managed computer and to generate information relating to an event, the event including information indicating a parameter of the monitoring object exceeds a threshold value; and a managed computer communication device which is configured to transmit the operating data from the monitoring object and the information relating to the event to the management computer, and wherein the management computer includes:

a management computer communication device which is configured to receive the operating data from the managed computer communication device and the information relating to the event from a sender managed computer;

an operating data buffer to store the operating data received by the management computer communication device, the operating data including an identifier identifying the first managed computer;

a data storage; and a management computer processor which is configured to compare the identifier identifying the first managed computer which includes the monitoring object with the sender managed computer that sends the information relating to the event, and wherein the management computer processor determines that the first managed computer is same as the sender managed computer, storing the information relating to the event and the associated operating data of the monitoring object associated with the event, in the operating data buffer, or wherein the management computer processor determines that the first managed computer is different from the sender management computer, not storing the information relating to the event and the associated operating data of the monitoring object associated with the event, in the operating data buffer; and wherein when the event indicates the parameter of the monitoring object exceeds the threshold value and the information relating to the event is stored in the operating data buffer, then the operating data received is stored in the data storage, wherein when the event does not indicate the parameter of the monitoring object exceeds the threshold value or the information relating to the event is not stored in the operating data buffer, then the operating data received is not stored in the data storage.

8. The management system as set forth in claim 7, wherein the management computer processor is configured, when the information relating to the event is received, to store the information relating to event in the operating data buffer in association with the operating data stored in the operating data buffer, to write a part of the operating data stored and the information relating to the event from the operating data buffer to the data storage, the part of the operating data stored to be written to the data storage relating to the event, based on the part of the operating data stored and the information relating to the event written to the data storage.

9. The management system as set forth in claim 7, wherein the management computer processor is configured, when the information relating to the event is received, to store the information relating to event in the operating data buffer in association with the operating data stored in the operating data buffer, to determine a part of the operating data to be written from the operating data buffer to the data storage based on the information relating to the event, and to write the part of the operating data stored from the operating data buffer to the data storage, and to carry out a trouble analysis based on the part of the operating data stored written to the data storage.

10. A management computer for monitoring a monitoring object in a managed first computer, from among a plurality of managed computers, the management computer comprising:

a communication device configured to receive operating data of a monitoring object inside the first managed computer and information relating to an event from a sender managed computer;

an operating data buffer to store the operating data received by the communication device, the operating data including an identifier identifying the first managed computer;

a data storage; and a processor configured to compare the identifier identifying the first managed computer with the sender managed computer that sends the information related to the event; and wherein the processor determines that the first managed computer is same as the sender managed computer, storing the information relating to the event and the operating data of the monitoring object associated with the event, in the operating data buffer, or wherein the processor determines that the first managed computer is different from the sender managed computer, not storing the information relating to the event and the operating data of the monitoring object associated with the event, in the operating data buffer; and wherein when the event indicates a parameter of the monitoring object exceeds a threshold value and the information relating to the event is stored in the operating data buffer, then the operating data received is stored in the data storage, wherein when the event does not indicate the parameter of the monitoring object exceeds the threshold value or the information relating to the event is not stored in the operating data buffer, then the operating data received is not stored in the data storage.

11. The management computer as set forth in claim 10, wherein the processor is configured, when the information relating to the event is received, to store the information relating to event in the operating data buffer in association with the operating data stored in the operating data buffer, to write the operating data stored and the information relating to the event from the operating data buffer to the data storage, and to identify from the operating data a portion of the operating data relating to the event, based on the operating data stored and the information relating to the event written to the data storage.

12. An operating management method for managing one or more monitoring objects, located in one or more managed computers, on the basis of operating data, the operating management method comprising:

receiving operating data of a monitoring object inside a first managed computer and information relating to an event from a sender managed computer;

storing the operating data in a memory, the operating data including an identifier that identifies the first managed computer that includes the monitoring object;

comparing the identifier with the sender computer that sends the information relating to the event;

storing, in the memory, the information relating to the event and the operating data of the monitoring object associated with the event when determined that the first managed computer is same as the sender managed computer;

not storing, in the memory, the information relating to the event and the operating data of the monitoring object associated with the event when determined that the first managed computer is different from the sender managed computer;

storing the operating data in a storage device when the event indicates a parameter of the monitoring object exceeds a threshold value and the information relating to the event is stored in the memory;

not storing the operating data in the storage device when the event does not indicate the parameter of the monitoring object exceeds the threshold value or the information relating to the event is not stored in the memory; and displaying the operating data identified.

13. The operating management method as set for in claim 12, wherein the information relating to the event includes at least one of information showing presence or absence of occurrence of the event, information showing an occurrence time of the event, and information showing a classification of the event, and identifying a portion of the operating data which relates to the event, based on the operating data and the information relating to the event including the at least one of the information showing presence or absence of occurrence of the event, the information showing the occurrence time of the event, and the information showing the classification of the event.

14. The operating management method as set for in claim 12, wherein the receiving comprises receiving the operating data of a plurality of monitoring objects, wherein the information relating to the event includes host information identifying from the operating data a portion of the operating data which is received from the monitoring object in which the event occurred, and identifying the portion of the operating data which relates to the event, based on the operating data and the information relating to the event including the host information.

15. The operating management method as set for in claim 14, wherein the information relating to the event includes information showing presence or absence of occurrence of the event, and identifying the portion of the operating data which relates to the event, based on the operating data and the information showing presence or absence of occurrence of the event.

16. In an non-transitory computer readable medium storing a program for managing a monitoring object on the basis of operating data, the program comprising:

code for receiving the operating data from a first managed computer of a plurality of managed computers that includes the monitoring object inside the first managed computer;

code for storing the operating data in a memory, the operating data including an identifier that identifies the first managed computer;

code for receiving information relating to an event from a sender managed computer;

code for comparing the identifier with the sender managed computer to determine whether the first managed computer is same as or difference from the sender managed computer;

code for storing the information relating to the event and the operating data of the monitoring object associated with the event in the memory when determined that the first managed computer is same as the sender managed computer;

code for not storing the information relating to the event and the operating data of the monitoring object associated with the event in the memory when determined that the first managed computer is different from the sender managed computer;

code for storing the operating data in a storage device when the event indicates a parameter of the monitoring object exceeds a threshold value and the information relating to the event is stored in the memory;

code for not storing the operating data in the storage device when the event does not indicate the parameter of the monitoring object exceeds the threshold value or the information relating to the event is not stored in the memory; and code for displaying the operating data identified.

* * * * *